UNITED STATES PATENT OFFICE.

JOSEPH KOETSCHET, OF LYON, AND ANDRÉ BARBIER, OF ST. FONS, NEAR LYON, FRANCE, ASSIGNORS TO SOCIÉTÉ CHIMIQUE DES USINES DU RHÔNE ANCIENNEMENT GILLIARD P. MONNET ET CARTIER, OF PARIS, FRANCE, A CORPORATION OF FRANCE.

MANUFACTURE OF NITRO-PHENYL NITRO-METHANES, THEIR HOMOLOGUES AND DERIVATIVES.

1,015,691.      Specification of Letters Patent.      Patented Jan. 23, 1912.

No Drawing.      Application filed August 17, 1911. Serial No. 644,602.

*To all whom it may concern:*

Be it known that we, JOSEPH KOETSCHET, of Lyon, France, and ANDRÉ BARBIER, of St. Fons, near Lyon, France, have invented certain new and useful Improvements in the Manufacture of Nitro-Phenyl Nitro-Methanes, Their Homologues and Derivatives, of which the following is a specification.

The invention relates to the manufacture of nitro-phenyl nitro-methanes, their homologues and derivatives, hereinafter referred to as bodies of the nitro-phenyl nitro-methane type, and it represents an improvement on the invention described in the specification of our prior application Serial No. 612,201 filed 4th. March 1911.

We have found that it is of advantage to employ the nitric acid in the form of vapor. In this form even the strongest nitric acids act on nitro-toluenes in the heat without fear of nitration in the nucleus occurring to a substantial extent. The employment of nitric acid vapors is likewise advantageous with acids of fairly low concentration (70 per cent. for example), as in this way the reaction temperature can be maintained without necessity for external heating.

Example: Heat 2000 kg. of ortho-nitrotoluene to 140° C. and then send 1000 kg. 100% nitric acid in the form of vapor through the mass in a period of about three hours, the temperature being maintained at 130°–140° C. The product of the reaction is worked up as in the said prior specification by washing it with water, extracting any nitrobenzoic acid and nitrobenzaldehyde contained therein by treatment with sodium carbonate and sodium bisulfite solutions, and then separating the ortho-nitrophenyl nitro-methane from excess nitrotoluene by prolonged extraction with caustic soda solution and finally precipitating with an acid. 400 to 500 kg. of ortho-nitrophenyl nitro-methane is obtained. The unattacked nitrotoluene is used again; the nitric acid which has not entered into reaction is condensed as it leaves the nitration apparatus and can likewise be reëmployed after it has been brought to the required concentration.

Instead of ortho-nitro-toluene, other nitro-toluenes, or the homologues or substitution products of the nitrotoluenes (hereinafter referred to as bodies of the nitro-toluene type) may be employed to obtain the corresponding bodies of the nitro-phenyl nitro-methane type.

What we claim and desire to secure by Letters Patent is:—

1. Process for the production of bodies of the nitro-phenyl nitro-methane type comprising treatment of a body of the nitrotoluene type in a hot state with nitric acid in the form of vapor.

2. Process for the production of bodies of the nitro-phenyl nitro-methane type, consisting in treating a body of the nitrotoluene type in a hot state with strong nitric acid in the form of vapor.

3. Process for the production of bodies of the nitro-phenyl nitro-methane type consisting in leading strong nitric acid in the form of vapor into a hot body of the nitro-toluene type and condensing the nitric acid which has not entered into reaction, substantially as described.

4. Process for the production of ortho-nitrophenyl nitro-methane, comprising the leading into ortho-nitro-toluene at about 130°–140° C. of strong nitric acid in the form of vapor.

5. Process for the production of ortho-nitrophenyl nitro-methane, consisting in leading into ortho-nitro-toluene at about 130°–140° C. strong nitric acid in the form of vapor and condensing the nitric acid which has not entered into reaction, substantially as described.

In testimony whereof we have signed our names to this specification in the presence of two subscribing witnesses.

JOSEPH KOETSCHET.
    ANDRÉ BARBIER.

Witnesses:
    THOS. N. BROWNE,
    MARIN VACHON.